United States Patent [19]

Scyocurka

[11] Patent Number: 5,894,105
[45] Date of Patent: Apr. 13, 1999

[54] MANHOLE SAFETY SHIELD CABLE ISOLATOR

[76] Inventor: Christopher I. Scyocurka, 130 Ellington St., Longmeadow, Mass. 01106

[21] Appl. No.: 08/226,671

[22] Filed: Apr. 12, 1994

[51] Int. Cl.$^6$ ............................................. H02G 9/00
[52] U.S. Cl. ....................................... 174/37; 52/20
[58] Field of Search ............................. 174/37, 39, 101, 174/48, 49; 52/20, 19, 21; 312/351.14, 138.1, 109, 327, 328; 211/191; 248/49; 361/286, 287

[56] References Cited

U.S. PATENT DOCUMENTS

| 173,170 | 2/1876 | Horner, Jr. | 174/39 |
|---|---|---|---|
| 272,833 | 2/1883 | Goodfellow | 174/39 |
| 286,938 | 10/1883 | Martin | 174/37 |
| 288,629 | 11/1883 | Gilman | 174/37 |
| 380,757 | 4/1888 | Hart et al. | |
| 397,300 | 2/1889 | Mack | 174/38 |
| 406,978 | 7/1889 | Wallace | |
| 3,390,225 | 6/1968 | Couch et al. | 174/37 |
| 3,731,448 | 5/1973 | Leo | 52/594 |
| 3,787,016 | 1/1974 | Laval, Jr. | 248/49 |
| 4,117,938 | 10/1978 | Klein | 211/191 |
| 4,133,021 | 1/1979 | King et al. | 361/365 |
| 4,145,857 | 3/1979 | Tilsen | 174/38 |
| 4,640,314 | 2/1987 | Mock | 174/101 |
| 4,717,987 | 1/1988 | Newmark et al. | 361/351 |
| 4,942,271 | 7/1990 | Corsi et al. | 174/101 |

FOREIGN PATENT DOCUMENTS

| 2537752 | 3/1977 | Germany | 174/49 |
|---|---|---|---|
| 5-49147 | 2/1993 | Japan | 174/37 |
| 0523476 | 3/1976 | U.S.S.R. | 174/72 A |

OTHER PUBLICATIONS

English Translation of Russian Patent No. 523476.
English Translation of German Patent No. 2537752.

*Primary Examiner*—Hyung S. Sough
*Attorney, Agent, or Firm*—Fishman, Dionne, Cantor & Colburn

[57] ABSTRACT

A transparent manhole safety cable shield isolator includes a front enclosure having openable doors positioned therein to gain access to cables behind the shield. The isolator also includes shelving to isolate different tiers of cables thus minimizing the fault blast risk to workers in the manhole.

12 Claims, 4 Drawing Sheets

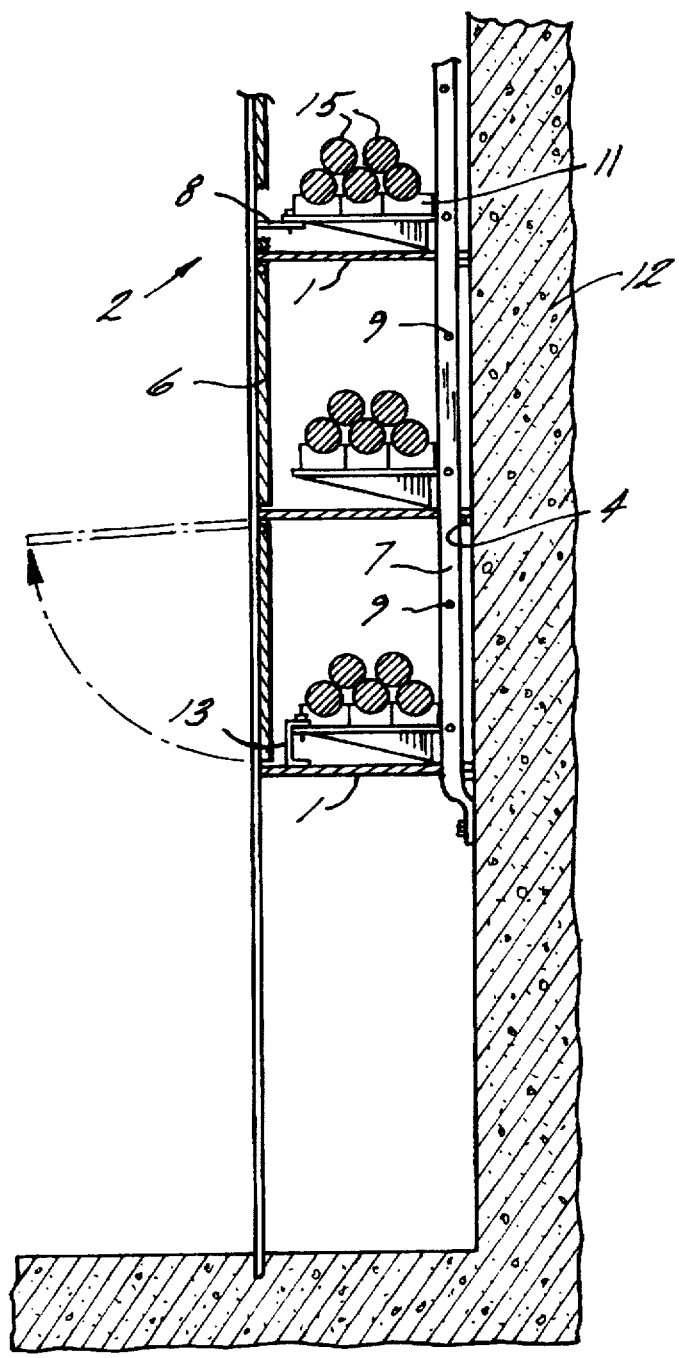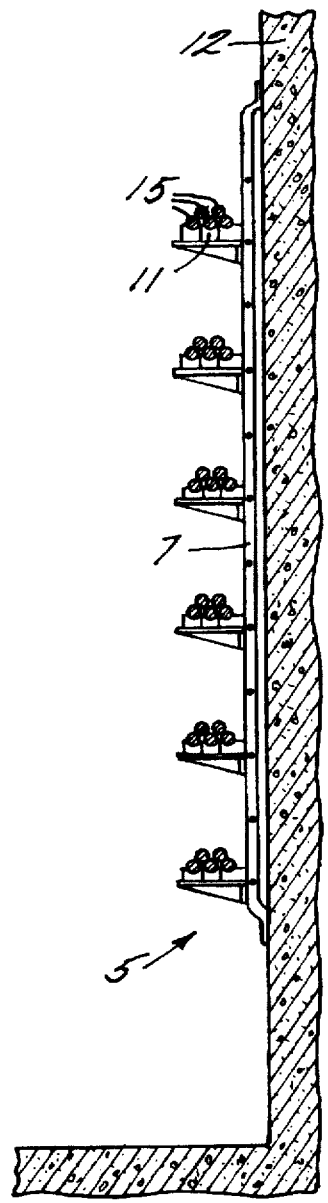
FIG. 3
FIG. 3A

5,894,105

MANHOLE SAFETY SHIELD CABLE ISOLATOR

BACKGROUND OF THE INVENTION

1. Field of the Invention

The present invention relates to an arrangement to protect utility workers from explosions in manholes by isolating cables from personnel with a transparent structure.

2. Prior Art

Heretofore those of skill in the art have attempted to protect personnel with blankets of various forms and materials. Barrday Guard® produces a hydro blanket to cover live cables while others are being repaired. The blanket is made of an aramid material which is a carbon type of fiber. The hydro blanket can inhibit a fault blast once it is in place. Similar to the hydro blanket is the ArcSafe™ suppression blanket by workrite. The materials used in the ArcSafe™ blanket are Kevlar® and Nomex III® in thin layers. Thin layers make the blanket light and portable. Moreover, ArcSafe™ includes hook & loop fasteners to simplify holding the blanket in place. While being effective in containing most blasts from faults in the cabling, workers utilizing this type of protection are still subject to risks while installing the blankets prior to beginning repair work.

Alternative protection which theoretically protects a worker from electric shock and heat is protective clothing designed particularly for exposure to such hazards. Wearing this type of clothing eliminates the completely unprotected situation of the worker while installing a cover, but is necessarily cumbersome and does not protect the worker from impact and percussion force caused by a blast.

Theoretically a worker could protect himself fairly well by wearing a suit while installing a safety blanket, but a blast while entering or exiting a manhole could still be seriously detrimental to the workers well being. Furthermore, using both a suit and a blanket is impractical and compliance with regulations mandating such a combination of equipment would be unlikely. Therefore a strong need exists for a system which provides safety from blasts and yet allows inspection and repair of utility cables in a manhole. This need is compounded by Occupational Safety and Hazards Administration regulations and the criteria used to determine if a violation has occurred.

SUMMARY OF THE INVENTION

In order to overcome some of the drawbacks inherent in the prior art, it is necessary to provide a system for containing blasts at all times. Only in this way can it be certain that protection will exist for workers entering or exiting a manhole. Moreover, to avoid unnecessary risks while inspecting cables, the safety system should allow inspection without disabling the blast containment structure. With these considerations in mind, the present inventor set out to create a system which would surpass the protection previously available.

The manhole safety shield cable isolator of the present invention is just such a system. The system in concept and in structure essentially creates a glass room within a manhole. The room is protected from blast dangers and provides a more hospitable working environment. The system includes a front enclosure positioned between a rack of cables on a manhole wall and the middle of the manhole. The front enclosure is constructed of a transparent material for ease of inspection and includes doors positioned so that individual cables can be accessed for repair. The front enclosure is of sufficient thickness and construction to effectively contain a blast from a fault in a cable. The system also contains shelves, of a similar material, placed between each level of cables so that a blast occurring on another level of cables will be contained even if one of the levels has been accessed for repair. The system may also contain side walls and a top and bottom wall if the front enclosure does not extend from ceiling to floor and end-to-end of the manhole. On each end of the manhole, cables are routed to exit through a duct bank. Duct banks are located anywhere on an end wall of the manhole. Usually more than one duct bank is provided. This generally creates a morass of disorganized cables such that the installation of shelving on an end wall is impracticable. Blast protection, however, is still necessary in this area and so a front enclosure is used alone in the end sections. The system creates a superior permanent containment structure which also allows inspection of all cables through transparent materials. The enclosures also allow for efficient identification of cables by labeling the containment structure. The assembly also takes no longer than currently available protection means to install and is generally less expensive.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 3 is a cross sectional view of FIG. 2 taken along section line 3—3 and shows alternate embodiments of shelf connection.

FIG. 3A is a cross sectional view of a conventional cable rack.

DETAILED DESCRIPTION OF THE PREFERRED EMBODIMENT

Figure 1:
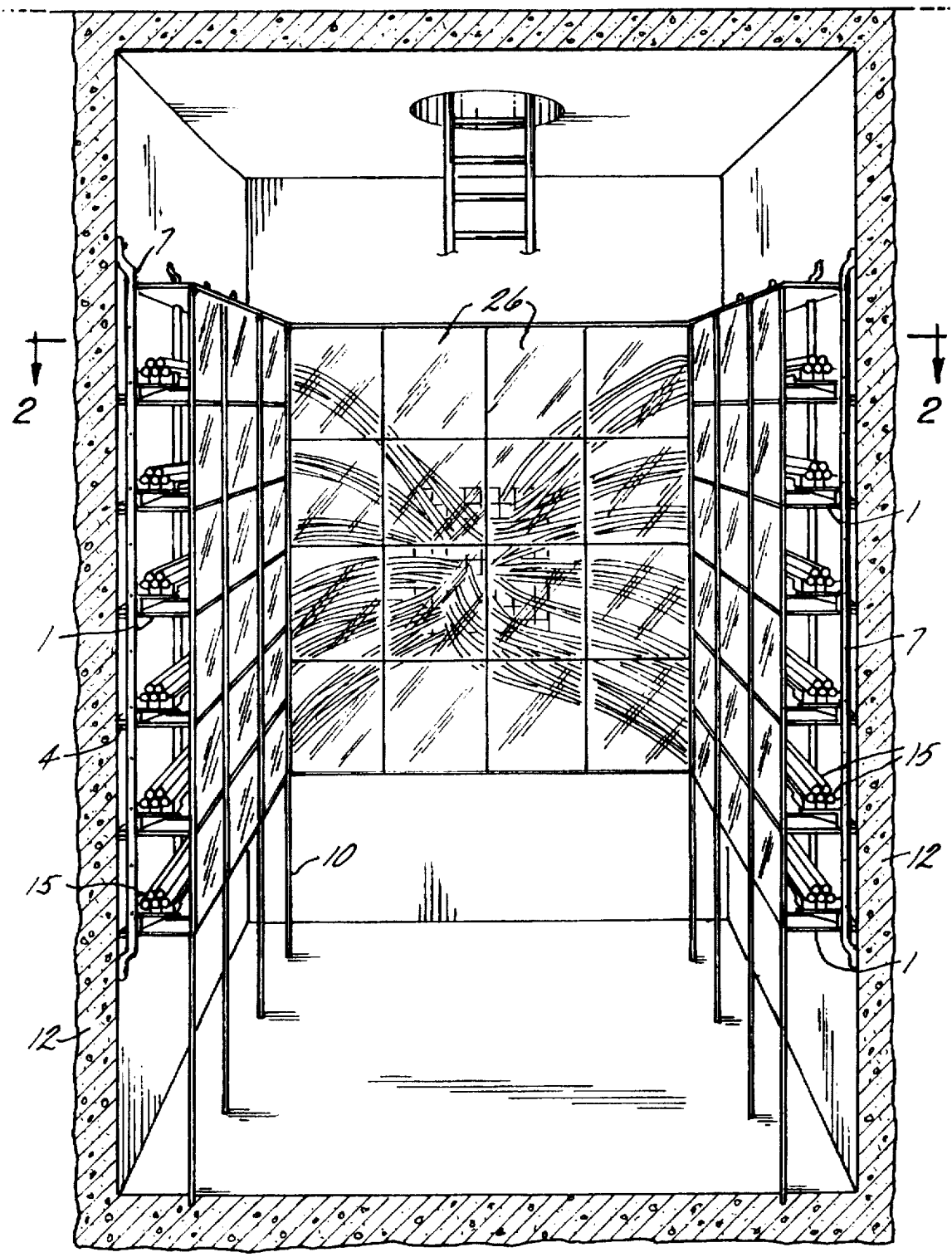
FIG. 1 is a front perspective view of a cable shield wall with openable doors.
Figure 2:
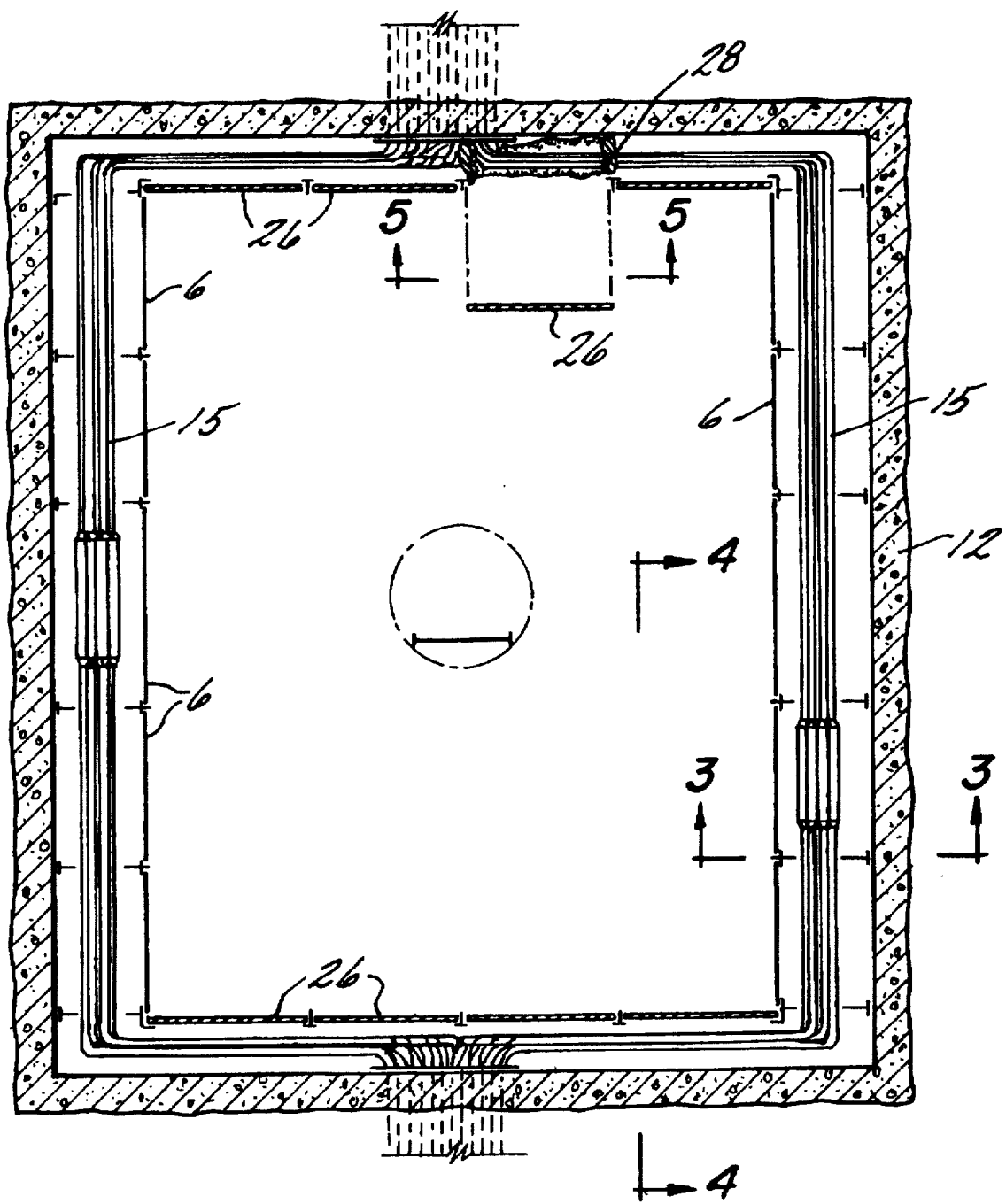
FIG. 2 is a plan view of FIG. 1 taken along section line 2—2.
Figure 5:
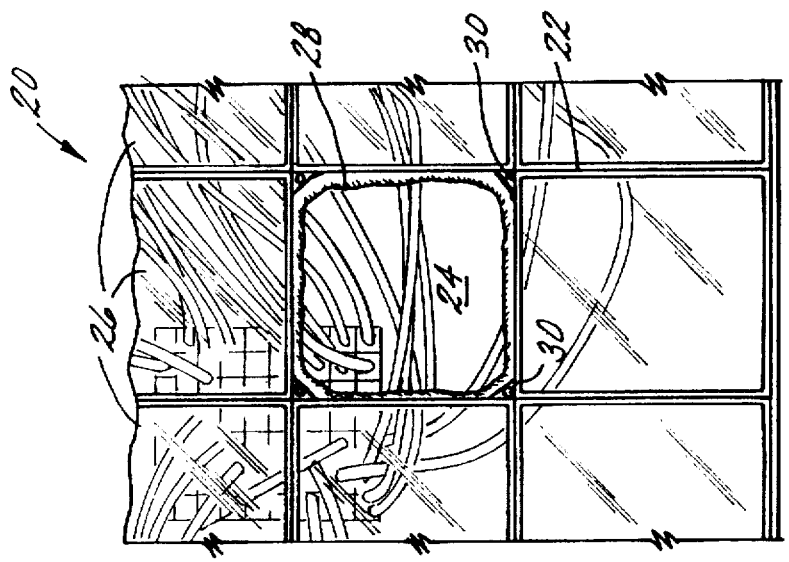
FIG. 5 is a perspective view of a blanket in use with an open panel of an end containment wall.
Figure 4:
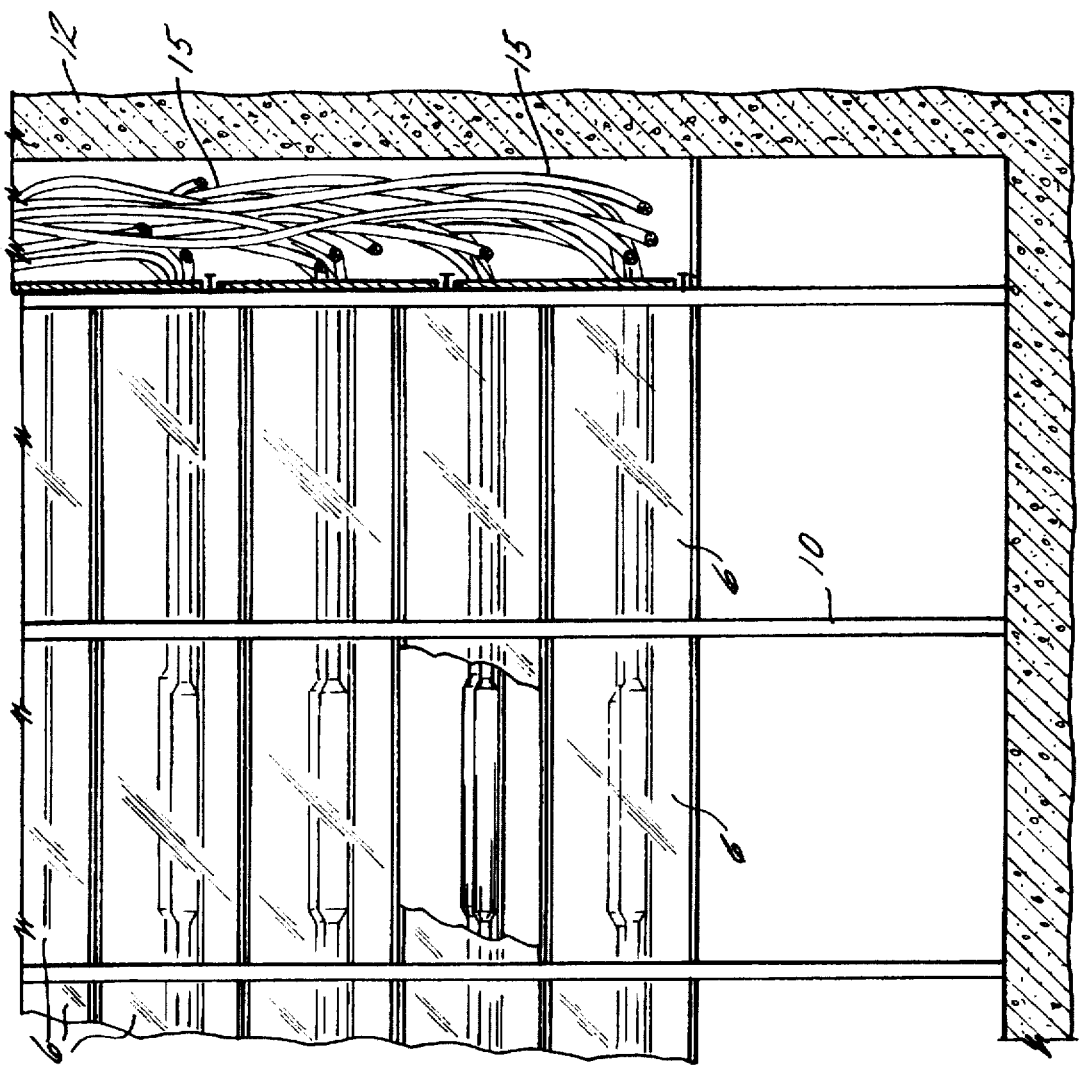
FIG. 4 is a cross sectional view of FIG. 2 taken along section line 4—4.

Referring to FIGS. 1 and 3 simultaneously, one of skill in the art can ascertain that the invention comprises a cabinet-like construction with multiple shelving 1 disposed between each length of cable supported on a conventional cable rack 5. The structure includes a front enclosure 2 with access doors 6 isolating the cables from the center of the manhole. Shelving 1 can be secured to shelf supports 4 and to front enclosure 2 by any fastening means. For the sake of clarity, a conventional cable rack 5 includes a wall support 7 having a multiplicity of engagement holes 9 for engaging cable trays 11 which each maintain one or more cables 15 in a predetermined position along a wall of a manhole (A conventional cable rack is illustrated in FIG. 3A).

Shelving 1 is supported by shelf supports 4 attached to a wall of the manhole on one side and by the front enclosure 2 on the other. The shelves can also be slide-in models or can be mounted in other ways. Slide-in shelves generally are adapted to engage existing cable trays with cable-tray-extending type fastening apparati 13 (This is illustrated in FIG. 3 which shows several embodiments in one drawing figure). It will be appreciated by one of skill in the art that the mounting possibilities discussed may be combined in same application, for example, the auxiliary supports 8 may be used in combination with tray extending apparatus 13 or each may be used independently. The front enclosure 2 is disposed in a generally parallel relationship and spaced from manhole wall 12. Front enclosure 2 may be supported by stanchions 10 extending from the floor or by other means such as hangers from the ceiling of the manhole or from supports extending from the manhole wall 12. It is even possible to support the front enclosure 2 using auxiliary supports 8 attached to cable tray 11 (Auxiliary support 8 is shown on the top level of FIG. 3). The most preferred method of supporting the entire cable isolator assembly is by both stanchions 10 and auxiliary supports 8. Stanchions may also be used to prevent doors 6 from being blown open in the event of a fault. In this case the stanchions would need to be detachable so that the doors could be opened by technicians needing to perform maintenance or repair procedures on the cables. The stanchions are most preferably constructed of a dielectric material.

Openable doors 6 are part of the front enclosure 2 and preferably open in an upswinging manner. The doors 6 are most preferably in hinged communication with the front enclosure 2; many different conventional hinge arrangements can be used. It is also possible to omit hinges and merely use a fastening device to hold the door in place when not in use. For example, one such arrangement would be to create a channel in the front enclosure, adjacent the access opening, which is a proper size to accept a door 6; another would be to utilize a number of eccentric cams to hold the doors closed. In any event doors 6 must be maintained in a closed position against the force of a blast yet be openable by a technician. For example, the stanchions may be detachably located such that they block the opening of doors 6 or alternatively a latch arrangement may be incorporated in stanchion 10 or door 6 to prevent the doors accidental opening. As one of skill in the art will readily perceive, there are many different effective arrangements which could be used while remaining squarely within the scope of the invention.

As can be ascertained from the drawings, the particular construction of the cable isolator places barriers (shelving or front enclosure) around and between each cable tray 11. Therefore, if a cable should suffer a failure, resulting in an explosion, the blast would be contained within an area bounded by manhole wall 12, front enclosure 2 with door 6 and shelves 1 above and below the faulty cable. The blast will continue to propagate along the given level until its energy has dissipated. The containment of the blast both helps prevent chain reactions from other cables which would otherwise be impacted by the blast and additionally provides a much safer working environment for personnel.

It should be noted that where the front enclosure does not extend the entire length of the manhole, side walls are utilized to cap off the end or ends of the cable isolator assembly. Alternatively, and preferably, the front enclosure 2 may extend to meet end containment walls 20 which cover the cables exiting the manhole. End containment walls 20 are front enclosures 2 without shelving, and are constructed most preferably using a grid 22 of suitable material to support the protective wall. The grid is most preferably of a dielectric material. It will be recognized by those skilled in the art, that other forms of support for the end containment walls 20 can be utilized. The end containment walls themselves may be large planar surfaces with entry holes 24 cut therein; panels 26 being adapted to cover said holes 24 to contain or protect workers from possible fault blast. It is equally effective, however, to merely mount removable panels 26 directly onto the support grid 22. Panels 26 may be hingedly connected to grid 22 or otherwise removably secured thereto. The only critical parameter is that when unopened the end containment walls must be sufficiently sealed to protect against possible blast from a fault.

Because end containment walls 20 are disposed over cables not supported by trays, indeed having a completely unorganized layout, shelving is not practicable. Thus when a panel 26 is opened by a technician to repair a cable the technician is not protected from blasts in other cables behind the end containment wall 20. To remedy this exposure protective blankets 28 are used in conjunction with support members 30 connectable to the grid in a stable manner to support the blankets 28. In effect the blankets seal off the work area by excluding the surrounding environment. This is contrary to the normal use of blast protection blankets. Normally these blankets are used to wrap a cable which might explode thus protecting a work area. The present invention, however, contemplates essentially wrapping the work area itself to protect from possible explosion in other wires.

The entire assembly is most preferably constructed of a transparent, high strength, dielectric material. The strength of the material must be capable of withstanding a blast of the magnitude normally associated with faults in cables carrying up to 35000 VAC (volts alternating current). General Electric's Lexan®, a polycarbonate plastic is preferred but other high temperature plastics or polymers can also be utilized.

The transparency of the material makes it possible for a worker to inspect cables through the isolator and thereby not subject themselves to possible blast impact. Moreover, the material can be tinted to protect a workers eyes from the arc associated with such faults. Once a problem is found the worker need only open the door 6 directly at the problem and avoid exposure to other hazardous cables.

The assembly works together to essentially construct an enclosed glass room within a manhole to protect workers therein.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A manhole safety shield cable isolator system comprising:

(a) a manhole having at least one cable entry port;

(b) a plurality of cables entering said manhole through said at least one cable entry port;

(c) support for said plurality of cables in said manhole;

(d) a frame mounted within said manhole and supporting a plurality of cable blast protective individually openable panels, said frame being located between said plurality of cables and an area of said manhole intended for periodic occupation by a technician such that said plurality of cables are contained between said plurality of panels and a wall of said manhole, said frame and plurality of protective individually openable panels substantially isolating said area from the effects of a cable blast, each one of said plurality of protective individually openable panels providing access to a target cable passing behind said panels.

2. A manhole safety shield cable isolator system as claimed in claim 1 further comprising a stanchion connected to said frame and positioned adjacent to one of said plurality of protective individually openable panels for preventing said one of said plurality of protective individually openable panels from being opened.

3. A manhole safety shield cable isolator system as claimed in claim 1 wherein said frame is mounted to at least one of a floor and a ceiling of said manhole.

4. A manhole safety shield cable isolator system as claimed in claim 1 wherein said frame is mounted to said support for said plurality of cables.

5. A manhole safety shield cable isolator system as claimed in claim 1 wherein said panels are mounted in said frame with hinges.

6. A manhole safety shield cable isolator system as claimed in claim 1 wherein said panels are mounted in said frame with a plurality of eccentric cams.

7. A manhole safety shield cable isolator system as claimed in claim 1 wherein said panels are mounted in said frame with a channel in said frame sized to accept an edge of a panel to be inserted therein.

8. A manhole safety shield cable isolator system as claimed in claim 1 wherein said panels are prevented from opening by removable stanchions mounted to a at least one of a ceiling and a floor of said manhole.

9. A manhole safety shield cable isolator system as claimed in claim 1 wherein said support for said plurality of cables is a plurality of supports and said system further comprises shelves mounted to separate said supports and wherein said shelves are substantially aligned with top and bottom edges of said panels.

10. A manhole safety shield cable isolator system as claimed in claim 9 wherein said shelves and panels are of a transparent material capable of withstanding a blast of up to 35,000 VAC.

11. A manhole safety shield cable isolator system as claimed in claim 9 wherein said shelves are mounted to said supports.

12. A manhole safety shield cable isolator system as claimed in claim 1 wherein said panels are of a transparent material capable of withstanding a blast of up to 35,000 VAC.

* * * * *